United States Patent [19]
Plasser et al.

[11] 3,882,607
[45] May 13, 1975

[54] MOBILE TRACK SURVEY APPARATUS

[76] Inventors: Erna Plasser; Josef Theurer, both of Johannesgasse 3, Vienna, Austria, A-101d; Franz Egleseer, Kleinreith Nr. 32, Vienna, Austria, A-4694

[22] Filed: July 23, 1973

[21] Appl. No.: 381,499

[30] Foreign Application Priority Data
Aug. 3, 1972 Austria .................. 6693/72

[52] U.S. Cl. .............. 33/174 R; 33/1 Q; 33/144
[51] Int. Cl. .............................................. B61k 9/00
[58] Field of Search ............ 33/144, 286, 287, 338, 33/375, 174 R, 1 Q, 146; 104/7 R

[56] References Cited
UNITED STATES PATENTS

| | | | |
|---|---|---|---|
| 721,933 | 3/1903 | Bennett | 33/174 R |
| 2,175,496 | 10/1939 | Troyer | 33/174 R |
| 3,514,862 | 6/1970 | Helgemeir | 104/7 R |
| 3,594,912 | 7/1971 | Sauterel | 33/338 |
| 3,735,495 | 5/1973 | Plasser et al. | 33/144 |
| 3,816,927 | 6/1974 | Theurer et al. | 33/144 |
| 3,828,440 | 8/1974 | Plasser et al. | 33/144 |

Primary Examiner—Richard E. Aegerter
Assistant Examiner—John W. Shepperd
Attorney, Agent, or Firm—Kurt Kelman

[57] ABSTRACT

Three vertically freely movable rail sensor bogies are spaced apart in the direction of track elongation on a survey car frame supported on undercarriages for movement on the track. Two transducers are associated with the three bodies for converting any relative movement of the rail sensors in respect to each other into an electrical error signal proportional to the relative movement, each transducer being connected to the intermediate bogie and with a respective one of the other survey bogies. A recorder is connected to the transducers for indicating the error signals.

7 Claims, 4 Drawing Figures

PATENTED MAY 13 1975 3,882,607

MOBILE TRACK SURVEY APPARATUS

The present invention relates to improvements in mobile apparatus for surveying the vertical position or warpage of the rails of a track whereon the apparatus is adapted to run.

Such apparatus is designed to determine or survey the geometric condition of track rails, for instance the warpage of the rails at rail joints, track warpage being defined as follows: if four points on the track are considered, two on each of the track rails, three of these points define a plane and the distance of the fourth point from this plane constitutes the warpage.

Conventional track surveying apparatus of this general type comprises a frame, undercarriages supporting the frame for movement on the track, and three rail sensing means, such as surveying bogies with flanged wheels engaging the track rails, spaced apart in the direction of track elongation and being vertically movable in respect of the frame for surveying at least one of the track rails. Transducer means are provided for converting any relative movement of the three rail sensing means in respect of each other into an electrical error signal proportional to the relative movement, and recording means are connected to the transducer means for indicating the error signal.

In such apparatus, it has been proposed to eliminate the disadvantageous influence of the vibrations of the frame on the survey results by associating a transducer with each axle of a three-axled undercarriage. These transducers are so connected that the two outer axles constitute the survey or measuring base while the intermediate axle constitutes the surveying means whose movements in respect of the base are surveyed and recorded. Particularly because of the number of transducers, this apparatus is expensive and complex.

Other known apparatus of this type uses at least partially mechanical elements for transmitting the survey parameters. This has the disadvantage that the vibrating frame unfavorably influences the survey results through the transmission of the survey parameters from the rail sensing means to the frame.

U.S. Pat. No. 3,735,495, dated May 29, 1973, seeks to solve this problem by using two rail sensing means, i.e., one undercarriage and one surveying bogie or axle interconnected by a bell crank lever. Elastically deformable rods carrying strain gages are used as transducers to measure or survey any track warpage under the undercarriage in respect of the surveying bogie or axle. This arrangement makes it possible not only to survey permanent track warpage but also elastically yielding low points along the track which yield under the load of the undercarriage running thereover because the ballast at such points is insufficiently compacted. While this structure has been used very successfully in track survey operations, vertical rail position determination at only two points has not been found sufficient in some instances.

It is accordingly a primary object of this invention to provide a mobile track survey apparatus which measures the vertical position or warpage of the rails of a track at least at three points spaced apart in the direction of track elongation but which is of simpler structure than known apparatus of this type.

This and other objects are accomplished according to the invention by associating two transducer means with the three rail sensing means, each transducer means being connected with an intermediate one of the rails sensing means and with a respective ones of the other rail sensing means.

Such a structure makes it possible to eliminate the vibrations of the frame as a source of survey errors since the two transducers are effectively associated only with the rail sensing means and not with the spring-supported frame so that each transducer reflects only the position of two of the three rail sensing means to which it is connected. Furthermore, the expensive and very sensitive electrical instruments for comparing three individual signals are avoided. Thus, the apparatus assures accurate surveys with a simple structure with a relatively long reference base.

In a preferred embodiment, the three rail sensing means are substantially vertically freely movable and load-free surveying bogies with flanged wheels which may also form the base for surveying lateral track errors or the track ordinate in a manner well known per se and forming no part of the present invention. This makes it possible to survey the condition of the track under the relatively heavy load of the undercarriages supporting the apparatus frame with an accurate reference base of considerable length, at the same time enabling the apparatus to be used for surveying the track ordinate. This enables a better comparison between the vertical and lateral position errors of a track on the same reference basis.

A particularly useful arrangement according to this invention comprises, in association with each rail, a pair of bell crank levers symmetrically arranged on, and in respect of, the intermediate rail sensing means, a bell crank lever arranged on each of the two other rail sensing means, and a connecting element, such as a Bowden cable, connecting a respective bell crank lever arranged on the intermediate rail sensing means with an associated bell crank lever arranged on the respective other rail sensing means. All four bell crank levers have the same lever ratio and are mounted on the frame, extending in the direction of the rail with which they are associated. The frame is preferably that of a track survey car but may also be the frame of a track leveling machine, in which case the transducers may be used for the automatic control of track lifting tools used to level the track in response to the surveyed errors.

This arrangement constitutes a very simple structure since the bell crank levers are used not only as part of the survey apparatus but also mount the surveying bogies on the frame. While the mechanical transmission elements between the rail sensing means, i.e., the bell crank levers, are mounted on the spring-supported and correspondingly vibrating frame, the frame vibrations do not influence the survey signals. Furthermore, since the lever ratios are the same for all bell crank levers, the mechanical transmission of the errors from the surveying bogies to the transducers is not distorted, the ratio between the measured parameter and the error signal being the same for each transducer. Also, all the parts of this survey apparatus are readily exchangeable and replaceable.

The bell crank levers have one arm linked to a respective rail sensing means, a fulcrum mounted on the frame and another arm, the other arms of the bell crank levers being connected by a respective one of the connecting elements. In an embodiment wherein the other arms of the bell crank lever arranged on the intermediate rail sensing means are constituted by elastically deformable rods and strain gage means mounted on the rods constitute the two transducers, the relatively small mass of the transmission elements assures a very sensitive transmission and, by the direct conversion into error signals, an exact indication thereof. This enables the vertical position of the rails to be accurately surveyed even at high survey speeds.

It is advantageous in the above embodiment to arrange one of the undercarriages between the intermediate rail sensing means and one of the other sensing means and another undercarriage between the intermediate rail sensing means and the other one of the other sensing means. The elastically deformable rod adjacent the one undercarriage is then connected by a respective one of the connecting elements to the other arm of the bell crank lever arranged on the other rail sensing means which is positioned adjacent the other undercarriage. This symmetric arrangement is particularly simple and accurate in operation, the vibrations of the frame being equally transmitted to all bell crank levers and being counterbalanced so that they cannot influence the survey results and error signals.

The above and other objects, advantages and features of the present invention will be better understood from the following detailed description of a now preferred embodiment thereof, which is merely illustrative, taken in conjunction with the accompanying drawing wherein FIG. 1 is a side elevational view of a track survey car schematically showing various track condition survey apparatus, including the arrangement of the apparatus of this invention on the frame of the car;

Figure 1:
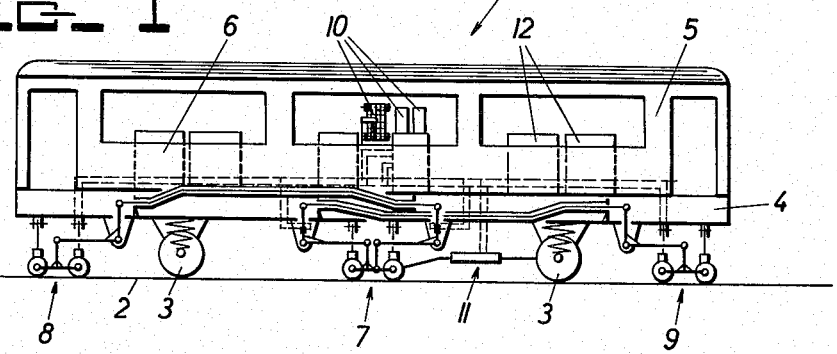

Referring now to the drawing and first to FIG. 1, the illustrated track survey car is shown to comprise frame 4 and undercarriages 3, 3 supporting the frame for movement on track rails 2, 2, spring means (shown in FIGS. 2 to 4) being interposed between the undercarriages and the frame so that it is resiliently supported on the undercarriages in a manner well known per se. The survey car may be self-propelled, a drive motor 6 being mounted on the car body 5 and coupled to one of the undercarriages for moving the car along the track.

The rail sensing means are constituted by double-axled surveying bogies with flanged wheels, an intermediate bogie 7 being arranged centrally of the car frame and the two other bogies 8 and 9 being arranged adjacent the respective ends of the frame. The three surveying bogies are spaced apart in the direction of track elongation and are vertically freely movable and free of the load of the car. Hydraulic jacks (not shown) may connect the bogies to the frame so that the bogies may be lifted off the track when desired, flanged wheels on the two axles of each bogie engaging the rails and sensing their vertical position. If desired, these hydraulic jacks may also be used in a known manner to press the flanged wheels against a selected one of the rails so that the bogies may simultaneously serve to survey the track ordinate.

The illustrated survey car also comprises survey apparatus for determining other track condition parameters, which do not form part of this invention, including apparatus 11 for surveying the track camber and computor and information storage devices 12 for the storage and application of the survey signals in subsequent track correction operations.

Figure 2:
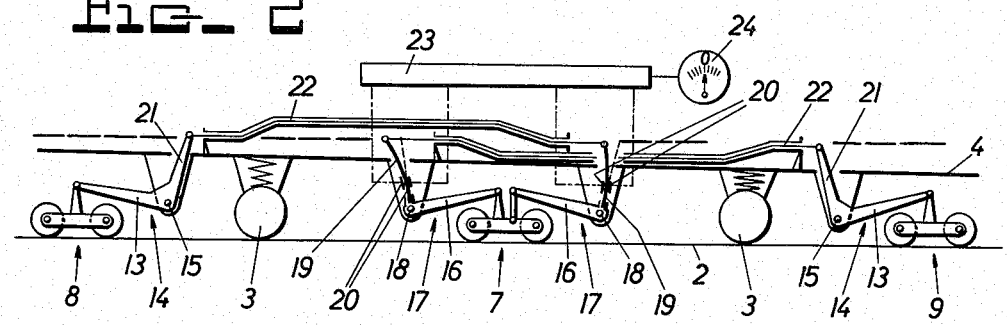
FIG. 2 is a schematic side elevational view, on an enlarged scale, of the survey apparatus of the invention, the car frame being shown as spring-supported.
Figure 3:
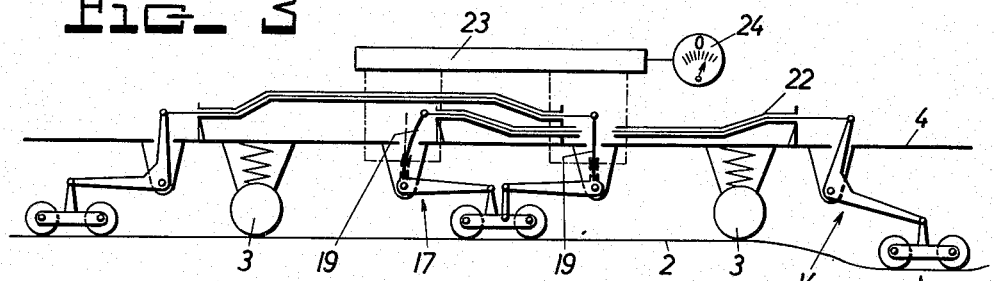
FIGS. 3 and 4 are similar views showing the apparatus in different operating positions.
Figure 4:
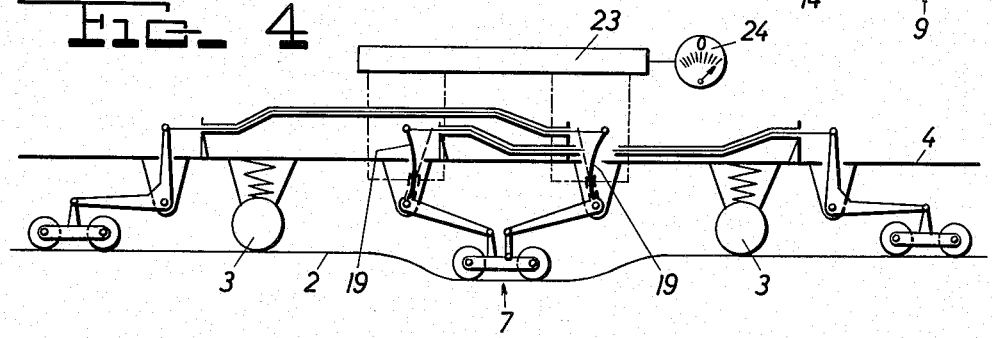

As will be seen from FIGS. 2 to 4, in association with each rail 2, a pair of bell crank levers 17, 17 is symmetrically arranged on, and in respect of, the intermediate surveying bogie 7. Each bell crank lever 17 has one arm 16 linked to bogie 7 and a fulcrum 18 pivoted to a bracket extending from frame 4. The other arm of each bell crank lever 17 is constituted by an elastically deformable rod 19 and strain gage means 20 are mounted on the rods to constitute the two transducer means used in the apparatus of this invention. A bell crank lever 14 is arranged on each of the two other surveying bogies 8 and 9, each bell crank lever 14 having one arm 13 linked to a respective bogie 8, 9 while fulcrum 15 thereof is pivoted to a bracket extending from frame 4. The other arm 21 of each bell crank lever 14 is connected with an associated deformable rod 19 of bell crank levers 17, 17 by means of a connecting element illustrated herein as a Bowden cable 22. The connecting element may also be constituted by other suitable mechanical transmission means, such as tackles.

In the illustrated embodiment, each arm 21 is connected to the deformable rod 19 on the other side of the intermediate bogie 7.

Each strain gage means 20 is electrically connected to a comparator circuit unit 23 of known design to receive the error signals emanating from the strain gage means, this unit being connected to indicator 24 for indicating the error signal. It could, of course, be connected to computor means and/or recording devices 10 shown in FIG. 1. As will be seen from the drawing, all bell crank levers have the same lever ratio.

The above-described apparatus operates in the following manner:

When the wheels of all surveying bogies 7, 8 and 9 are in the same plane (FIG. 1) and the car frame 4 is not vibrating, the elastically deformable rods 19 are not deformed and the strain gage means 20 transmit no signal to unit 23. Therefore, indicator 24 shows the pointer at zero.

If an adjustment is desired, the arm 16 of bell crank levers 17, 17 may be mounted on surveying bogie 7 for longitudinal adjustment in respect thereof.

If the car frame 4 moves resiliently on its spring supports (FIG. 2) while the three surveying bogies remain in a plane, the two deformable rods are deformed in the same direction by the same amount. The comparator unit 23 is so wired that the signals transmitted in this position by the strain gage means balance each other out so that the indicator 24 still shows zero, i.e., no track error.

However, when one of the surveying bogies, i.e., bogie 9 in FIG. 3, enters into a rail depression, for instance a track position error at a track joint, the bell crank lever 14 will be pivoted, this pivoting movement being transmitted to the associated rod 19 by Bowden cable 20 to cause this rod to be deformed while the other deformable rod 19 remains straight. The signal proportional to this deformation of the one rod 19 is transmitted to unit 23 to produce a movement of the pointer of indicator 24, i.e., to indicate the surveyed track error.

When the intermediate surveying bogie 7 reaches this same rail warpage (see FIG. 4), both rods 19 are deformed in opposite directions by the same amount, the two corresponding electrical signals are added in the comparator circuit unit 23 and the indicator 24 will show twice the error indicated in the position of FIG. 3. Because the same track error is shown in different value, depending on whether it is detected by the intermediate or one of the other surveying bogies, it is relatively simple to make use of the error signals indicated or recorded on recording instrument 10.

It is also possible to use the differently indicated values of the error signals produced by the different surveying bogies to distinguish between elastic and permanent deformations of the rails. For this purpose, the intermediate surveying bogie may be subjected to a load to test elastic deformations of the rail under such a load. This may be done by using an undercarriage as the intermediate rail sensing means.

It will be understood that the invention is not limited to the illustrated structure. Various transducers and/or connecting elements may be used within the scope of this invention as defined in the appended claims.

We claim:

1. In mobile apparatus for surveying the vertical position or warpage of the rails of a track whereon the apparatus is adapted to run, comprising a frame, undercarriages supporting the frame for movement on the track, three rail sensing means for each of the rails, the rail sensing means being spaced apart in the direction of track elongation and being vertically movably mounted on, and in respect of, the frame for surveying the rails, transducer means for converting any relative movement of the rail sensing means in respect of each other into an electrical error signal proportional to the relative movement, and recording means connected to the transducer means for indicating the error signals, the improvement of
  1. the transducer means consisting of two transducers,
  2. means operatively connecting the two transducers to one of the rail sensing means for movement therewith,
  3. two connecting elements each having a first end connected to a respective one of the transducer connecting means and a second end connected to a respective one of the two rail sensing means other than said one rail sensing means,
    a. the connecting elements operatively connecting each of the transducers to the respective other rail sensing means for movement therewith, and
  4. two motion transmitting elements mounted on the frame and extending oppositely in the direction of track elongation,
    a. connected at one end to a respective transducer connecting means and connected at the other end to said rail sensing means.

2. In the mobile surveying apparatus of claim 1, said one rail sensing means being an intermediate one of the rail sensing means and the two other rail sensing means being spaced on respective sides of the intermediate rail sensing means to constitute outer rail sensing means, the two motion transmitting elements being arranged symmetrically in respect of each other.

3. In the mobile surveying apparatus of claim 2, each of the motion transmitting elements being connected to the intermediate rail sensing means.

4. In the mobile surveying apparatus of claim 3, each motion transmitting element constituted by one arm of respective bell crank levers, the one arm being linked to the intermediate rail sensing means and the other arm of the bell crank lever constituting the means operatively connecting the transducers to the intermediate rail sensing means, and further bell crank levers respectively linked to a respective one of the outer rail sensing means and to the second ends of a respective one of the connecting elements.

5. In the mobile surveying apparatus of claim 4, the connecting elements being Bowden cables.

6. In the mobile surveying apparatus of claim 4, the other bell crank lever arms being elastically deformable rods and the transducers being strain gage means mounted on the rods, one of the arms of the further bell crank levers being linked to a respective one of the outer rail sensing means and the connecting elements linking a second arm of the further bell crank levers to a respective one of the rods.

7. In the mobile surveying apparatus of claim 4, a respective one of the undercarriages being arranged between the intermediate rail sensing means and a respective one of the outer rail sensing means, and the connecting elements connecting the bell crank lever linked to the intermediate rail sensing means adjacent one of the undercarriages to the further bell crank lever linked to one of the outer rail sensing means adjacent the other undercarriage on the other side of the intermediate rail sensing means.

* * * * *

UNITED STATES PATENT OFFICE
CERTIFICATE OF CORRECTION

PATENT NO. : 3,882,607
DATED : May 13, 1975
INVENTOR(S) : Franz Plasser, deceased, by Erna Plasser et al It is certified that error appears in the above-identified patent and that said Letters Patent are hereby corrected as shown below:

At [76], before "Erna" insert --Franz Plasser, deceased, by-- and after "Plasser" insert --, heir--

Signed and Sealed this fifth Day of July 1977

[SEAL]

Attest:

RUTH C. MASON
Attesting Officer

C. MARSHALL DANN
Commissioner of Patents and Trademarks